(12) United States Patent
Smith

(10) Patent No.: US 8,742,899 B2
(45) Date of Patent: *Jun. 3, 2014

(54) METHODS AND APPARATUSES TO IDENTIFY DEVICES

(75) Inventor: John Stephen Smith, Berkeley, CA (US)

(73) Assignee: Alien Technology Corporation, Morgan Hill, CA (US)

(*) Notice: Subject to any disclaimer, the term of this patent is extended or adjusted under 35 U.S.C. 154(b) by 92 days.

This patent is subject to a terminal disclaimer.

(21) Appl. No.: 13/330,384

(22) Filed: Dec. 19, 2011

(65) Prior Publication Data

US 2012/0154123 A1 Jun. 21, 2012

Related U.S. Application Data

(63) Continuation of application No. 10/915,725, filed on Aug. 9, 2004, now Pat. No. 8,102,244.

(60) Provisional application No. 60/494,143, filed on Aug. 9, 2003, provisional application No. 60/518,229, filed on Nov. 7, 2003.

(51) Int. Cl.
*H04Q 5/22* (2006.01)
*G06K 7/08* (2006.01)
*G08B 13/14* (2006.01)

(52) U.S. Cl.
USPC ..... 340/10.32; 340/10.2; 340/10.4; 340/10.5; 340/870.2

(58) Field of Classification Search
CPC ................................... H04Q 5/22; G06K 7/08
USPC .................. 340/10.2, 10.1, 10.33, 10.4, 10.5, 340/870.2; 235/385, 451, 375; 370/312, 370/328, 349; 713/202; 455/515
See application file for complete search history.

(56) References Cited

U.S. PATENT DOCUMENTS

| 3,866,029 | A | 2/1975 | Chevalier |
| 4,071,908 | A | 1/1978 | Brophy et al. |
| 4,107,675 | A | 8/1978 | Sellers et al. |
| RE31,375 | E | 9/1983 | Sellers et al. |
| 4,495,496 | A | 1/1985 | Miller, III |
| 4,510,495 | A | 4/1985 | Sigrimis et al. |
| 4,667,193 | A | 5/1987 | Cotie et al. |

(Continued)

FOREIGN PATENT DOCUMENTS

| CA | 2266337 | 9/2000 |
| CN | 1255993 | 6/2000 |

(Continued)

OTHER PUBLICATIONS

Draft protocol specification for a 900 MHz Class 0 Radio Frequency Identification Tag, Auto-ID Center, Feb. 23, 2003, 49 pages.

(Continued)

*Primary Examiner* — Nam V Nguyen
(74) *Attorney, Agent, or Firm* — Blakely, Sokoloff, Taylor & Zafman LLP

(57) ABSTRACT

An apparatus and method to identify devices including a first set of commands to identify devices in a first state and a second set of commands to identify devices in a second state, wherein devices identified in the first state are placed in the second state and devices identified in the second state are placed in the first state.

24 Claims, 15 Drawing Sheets

(56) References Cited

U.S. PATENT DOCUMENTS

| | | |
|---|---|---|
| 4,785,291 A | 11/1988 | Hawthorne |
| 4,822,990 A | 4/1989 | Tamada et al. |
| 5,053,774 A | 10/1991 | Schuermann et al. |
| 5,063,386 A | 11/1991 | Bourdeau et al. |
| 5,144,314 A | 9/1992 | Malmberg et al. |
| 5,245,534 A | 9/1993 | Waterhouse et al. |
| 5,266,925 A | 11/1993 | Vercellotti et al. |
| 5,305,008 A | 4/1994 | Turner et al. |
| 5,339,073 A | 8/1994 | Dodd et al. |
| 5,365,551 A | 11/1994 | Snodgrass et al. |
| 5,387,915 A | 2/1995 | Moussa et al. |
| 5,387,993 A | 2/1995 | Heller et al. |
| 5,397,349 A | 3/1995 | Kolff et al. |
| 5,398,326 A | 3/1995 | Lee |
| 5,410,315 A | 4/1995 | Huber |
| 5,434,572 A | 7/1995 | Smith |
| 5,438,335 A | 8/1995 | Schuermann et al. |
| 5,444,448 A | 8/1995 | Schuermann et al. |
| 5,491,482 A | 2/1996 | Dingwall et al. |
| 5,500,650 A | 3/1996 | Snodgrass et al. |
| 5,502,445 A | 3/1996 | Dingwall et al. |
| 5,519,381 A | 5/1996 | Marsh et al. |
| 5,537,105 A | 7/1996 | Marsh et al. |
| 5,545,291 A | 8/1996 | Smith et al. |
| 5,548,291 A | 8/1996 | Meier et al. |
| 5,550,547 A | 8/1996 | Chan et al. |
| 5,557,280 A | 9/1996 | Marsh et al. |
| 5,583,850 A | 12/1996 | Snodgrass et al. |
| 5,604,486 A | 2/1997 | Lauro et al. |
| 5,627,544 A | 5/1997 | Snodgrass et al. |
| 5,640,002 A | 6/1997 | Ruppert et al. |
| 5,641,365 A | 6/1997 | Peterson et al. |
| 5,673,037 A | 9/1997 | Cesar et al. |
| 5,680,459 A | 10/1997 | Hook et al. |
| 5,698,837 A | 12/1997 | Furuta |
| 5,699,066 A | 12/1997 | Marsh et al. |
| 5,726,630 A | 3/1998 | Marsh et al. |
| 5,742,238 A | 4/1998 | Fox |
| 5,774,062 A | 6/1998 | Ikefuji |
| 5,774,876 A | 6/1998 | Woolley et al. |
| 5,777,561 A | 7/1998 | Chieu et al. |
| 5,804,810 A | 9/1998 | Woolley et al. |
| 5,828,318 A | 10/1998 | Cesar |
| 5,832,520 A | 11/1998 | Miller |
| 5,841,365 A | 11/1998 | Rimkus |
| 5,850,187 A | 12/1998 | Carrender et al. |
| 5,856,788 A | 1/1999 | Walter et al. |
| 5,874,724 A | 2/1999 | Cato |
| 5,883,582 A | 3/1999 | Bowers et al. |
| 5,892,441 A | 4/1999 | Woolley et al. |
| 5,909,559 A | 6/1999 | So |
| 5,929,779 A | 7/1999 | MacLellan et al. |
| 5,940,006 A | 8/1999 | MacLellan et al. |
| 5,963,134 A | 10/1999 | Bowers et al. |
| 5,966,083 A | 10/1999 | Marsh et al. |
| 5,974,078 A | 10/1999 | Tuttle et al. |
| 5,995,017 A | 11/1999 | Marsh et al. |
| 5,995,019 A | 11/1999 | Chieu et al. |
| 6,002,344 A | 12/1999 | Bandy et al. |
| 6,021,433 A | 2/2000 | Payne et al. |
| 6,027,027 A | 2/2000 | Smithgall |
| 6,034,603 A | 3/2000 | Steeves |
| 6,036,101 A | 3/2000 | Hass et al. |
| 6,072,801 A | 6/2000 | Wood, Jr. et al. |
| 6,078,258 A | 6/2000 | Auerbach et al. |
| 6,084,512 A | 7/2000 | Elberty et al. |
| 6,089,453 A | 7/2000 | Kayser et al. |
| 6,102,286 A | 8/2000 | Hammond |
| 6,130,630 A | 10/2000 | Grohs et al. |
| 6,177,858 B1 | 1/2001 | Raimbault et al. |
| 6,198,381 B1 | 3/2001 | Turner et al. |
| 6,204,765 B1 | 3/2001 | Brady et al. |
| 6,236,315 B1 | 5/2001 | Helms et al. |
| 6,259,367 B1 | 7/2001 | Klein |
| 6,263,332 B1 | 7/2001 | Nasr et al. |
| 6,282,186 B1 | 8/2001 | Wood, Jr. |
| 6,307,847 B1 | 10/2001 | Wood, Jr. |
| 6,307,848 B1 | 10/2001 | Wood, Jr. |
| 6,321,982 B1 | 11/2001 | Gaultier |
| 6,377,203 B1 | 4/2002 | Doany |
| 6,379,058 B1 | 4/2002 | Petteruti et al. |
| 6,412,086 B1 | 6/2002 | Friedman et al. |
| 6,429,776 B1 | 8/2002 | Alicot et al. |
| 6,438,540 B2 | 8/2002 | Nasr et al. |
| 6,442,496 B1 | 8/2002 | Pasadyn et al. |
| 6,443,891 B1 | 9/2002 | Grevious |
| 6,456,191 B1 | 9/2002 | Federman |
| 6,476,708 B1 | 11/2002 | Johnson |
| 6,480,143 B1 | 11/2002 | Kruger et al. |
| 6,483,427 B1 | 11/2002 | Werb |
| 6,496,833 B1 | 12/2002 | Goldberg et al. |
| 6,512,463 B1 | 1/2003 | Campbell et al. |
| 6,538,563 B1 | 3/2003 | Heng |
| 6,538,564 B1 | 3/2003 | Cole |
| 6,550,674 B1 | 4/2003 | Neumark |
| 6,566,997 B1 | 5/2003 | Bradin |
| 6,570,487 B1 | 5/2003 | Steeves |
| 6,600,443 B2 | 7/2003 | Landt |
| 6,609,656 B1 | 8/2003 | Elledge |
| 6,630,885 B2 | 10/2003 | Hardman et al. |
| 6,633,223 B1 | 10/2003 | Schenker et al. |
| 6,641,036 B1 | 11/2003 | Kalinowski |
| 6,646,543 B1 | 11/2003 | Mardinian et al. |
| 6,661,336 B1 | 12/2003 | Atkins |
| 6,677,852 B1 | 1/2004 | Landt |
| 6,690,263 B1 | 2/2004 | Grieu |
| 6,725,260 B1 | 4/2004 | Philyaw |
| 6,763,996 B2 | 7/2004 | Rakers |
| 6,784,787 B1 | 8/2004 | Atkins et al. |
| 6,837,427 B2 | 1/2005 | Overhultz et al. |
| 6,859,801 B1 | 2/2005 | Law et al. |
| 6,868,073 B1 | 3/2005 | Carrender |
| 6,876,294 B1 | 4/2005 | Regan |
| 6,882,995 B2 | 4/2005 | Nasr et al. |
| 6,889,234 B1 | 5/2005 | Li et al. |
| 6,933,677 B1 | 8/2005 | Karpen |
| 6,988,667 B2 | 1/2006 | Stewart et al. |
| 7,009,495 B2 | 3/2006 | Hughes et al. |
| 7,009,496 B2 | 3/2006 | Arneson et al. |
| 7,018,575 B2 | 3/2006 | Brewer et al. |
| 7,028,024 B1 | 4/2006 | Kommers et al. |
| 7,043,633 B1 | 5/2006 | Fink et al. |
| 7,053,755 B2 | 5/2006 | Atkins et al. |
| 7,119,664 B2 | 10/2006 | Roesner |
| 7,193,504 B2 | 3/2007 | Carrender et al. |
| 7,195,173 B2 | 3/2007 | Powell et al. |
| 7,253,717 B2 | 8/2007 | Armstrong et al. |
| 7,262,686 B2 | 8/2007 | Stewart et al. |
| 7,272,466 B2 | 9/2007 | Graushar et al. |
| 7,284,703 B2 | 10/2007 | Powell et al. |
| 7,289,015 B2 | 10/2007 | Moyer |
| 7,315,522 B2 | 1/2008 | Wood, Jr. |
| 7,356,749 B2 | 4/2008 | Dominique et al. |
| 7,562,083 B2 | 7/2009 | Smith et al. |
| 7,716,160 B2 | 5/2010 | Smith et al. |
| 7,716,208 B2 | 5/2010 | Smith et al. |
| 2001/0023482 A1 | 9/2001 | Wray |
| 2001/0024448 A1 | 9/2001 | Takase et al. |
| 2001/0038037 A1 | 11/2001 | Bridgelall et al. |
| 2002/0123325 A1 | 9/2002 | Cooper |
| 2002/0149481 A1 | 10/2002 | Shanks et al. |
| 2003/0099211 A1 | 5/2003 | Moulsley et al. |
| 2004/0179588 A1 | 9/2004 | Kuffner et al. |
| 2006/0279408 A1 | 12/2006 | Atkins |
| 2008/0018431 A1 | 1/2008 | Turner et al. |

FOREIGN PATENT DOCUMENTS

| | | |
|---|---|---|
| EP | 0553905 | 8/1993 |
| EP | 0 702 324 | 3/1996 |
| GB | 2 340 692 | 2/2000 |
| JP | 2001-516486 | 9/2001 |
| JP | 2001-522485 | 11/2001 |
| WO | WO 98/32092 | 7/1998 |

(56) References Cited

FOREIGN PATENT DOCUMENTS

| WO | WO 98/39725 | 9/1998 |
|---|---|---|
| WO | WO 01/01326 | 1/2001 |
| WO | WO 01/41043 | 6/2001 |
| WO | WO 01/58252 | 8/2001 |
| WO | WO 02/054365 | 7/2002 |
| WO | WO 02/097708 A2 | 12/2002 |
| WO | WO 03/032240 A2 | 4/2003 |
| WO | WO 2005/015480 A2 | 2/2005 |

OTHER PUBLICATIONS

EPC™ Tag Data Standards Version 1.1 Rev. 1.24, Standard Specification, Apr. 1, 2004, Copyright 2004 EPCglobal®, 78 pages.
Floerkemeier, Christian, et. al., "PML Core Specification 1.0, Auto-ID Center Recommendation," Sep. 15, 2003, Copyright 2003 Auto-ID Center, 48 pages.
PCT International Preliminary Report on Patentability and Written Opinion for Appln No. PCT/US2004/036991, mailed May 18, 2006, 8 pages.
PCT Invitation to Pay Additional Fees for PCT International Application No. US02/17159, mailed Oct. 16, 2002, 9 pages.
PCT Notification of Transmittal of the International Search Report or the Declaration for Appln No. PCT/US02/17159, mailed Jan. 15, 2003, 9 pages.
PCT Notification of Transmittal of the International Search Report or the Declaration for Appln No. PCT/US02/33402, mailed Jan. 15, 2003, 5 pages.
PCT Notification of Transmittal of the International Search Report or the Written Opinion of the International Searching Authority, or Declaration for Appln No. PCT/US2004/025883, mailed Nov. 11, 2004, 12 pages.
PCT Preliminary Examination Report for PCT Appln No. PCT/US2002/17159, mailed Nov. 4, 2005, 5 pages.
PCT Transmittal of the International Search Report and the Written Opinion of the International Searching Authority for PCT International Application No. PCT/US2004/036991, mailed Feb. 28, 2005, 13 pages.
PCT Written Opinion for PCT Appln No. PCT/US02/33402, mailed Jan. 26, 2005, 4 pages.
PCT Written Opinion of the International Preliminary Examining Authority and Written Opinion for Appln No. PCT/US02/17159, mailed May 6, 2005, 5 pages.
TAGSYS, SA, International Organization for Standardization (ISO) and International Electrotechnical Commission (IEC) Patent Statement and Licensing Declaration, 3 pages, SGS__200602__497__18000-GAM1__IP3.pdf.
Technical Report, 860MHz-930-MHz Class 1 Radio Frequency Identification Tag Rado Frequency & Logical Communication Interface Specification Candidate Recommendation, Version 1.0.1, Auto-ID Center, published Nov. 14, 2002, Auto-ID Center Massachusetts Institute of Technology, 77 Massachusetts Avenue, Bldg. 3-449, Cambridge, MA 02139-4307, USA, 19 pages.
Zebra Technologies Corporation, Patent Statement and Licensing Declaration, 4 pages International Organization for Standardization (ISO) and International Electrotechnical Commission (IEC) JTC1/SC31/WG4 ISO/IEC-18000 Part 6.

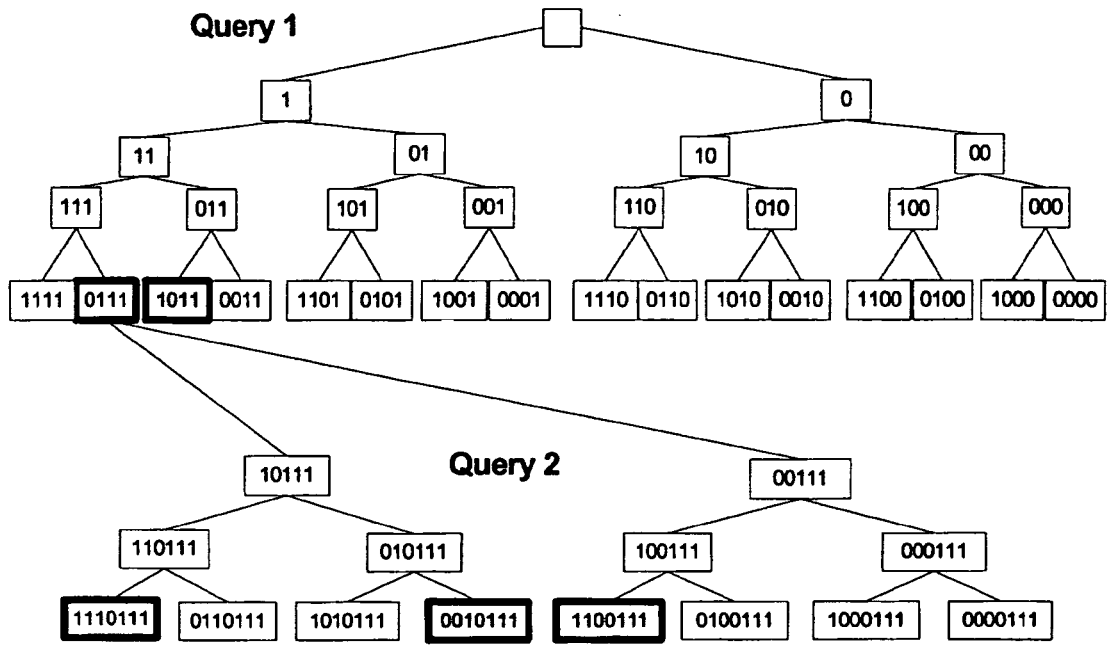
FIG. 12A
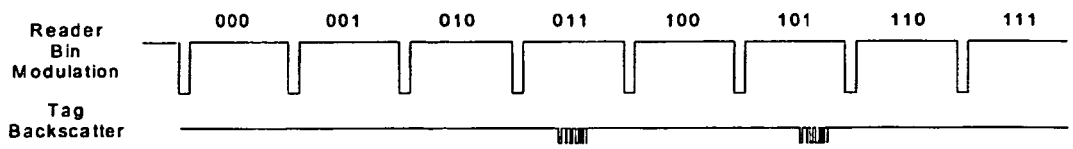
FIG. 12B  Query 1 Backscatter
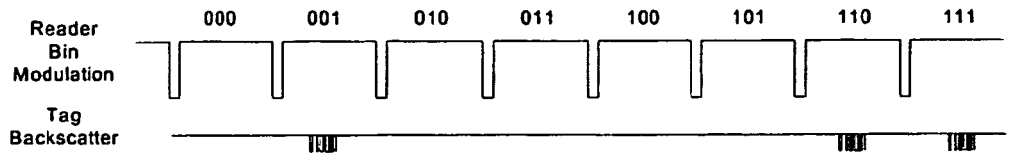
FIG. 12C  Query 2 Backscatter

METHODS AND APPARATUSES TO IDENTIFY DEVICES

This application is a continuation of U.S. patent application Ser. No. 10/915,725 filed on Aug. 9, 2004 now U.S. Pat. No. 8,102,244, which is related to and claims the benefit of U.S. Provisional Patent Application No. 60/494,143, filed Aug. 9, 2003; and this application is also related to and claims the benefit of U.S. Provisional Patent Application No. 60/518,229, filed Nov. 7, 2003, and this application incorporates by reference the entire content of these two provisional applications; the present application also claims the benefit of, and incorporates by reference, two prior U.S. patent applications: (1) U.S. patent application Ser. No. 10/160,458, filed May 30, 2002; and (2) U.S. patent application Ser. No. 10/267,924, filed Oct. 8, 2002.

FIELD OF THE INVENTION

The present invention relates to the field of devices having an identifier, such as tags, and further relates to methods and apparatuses for identifying such tags.

BACKGROUND INFORMATION

It is desirable to interrogate multiple wireless tags by sending from an interrogating transmitter a code and having information transmitted by the tag in response. This is commonly accomplished by having the tag listen for an interrogation message and for it to respond with a unique serial number and/or other information.

Since only one tag can be read at a time, some prior art devices and apparatuses have improved this interrogation and response process by utilizing a ready-quiet protocol. In the case of a ready-quiet protocol, the tags, once placed in the quiet state, must either timeout or be touched by a talk command before they can participate in an inventory. Several talk commands can be issued before an inventory, but there is no guarantee that multipath will be favourable, the frequency right, or even that a specific tag is physically close enough to the reader at that point in time. Any tags that miss the command or commands to wake up at the beginning of the inventory process will be missed, which is undesirable.

The use of a time-out for a persistent quiet is a conceptually simple alternative, but the manufacture of a tag that has a tightly controlled persistence time is difficult. Also, for example, 10 seconds might be too short a time to inventory a large number of tags, and yet 10 seconds might be long enough to interfere with multiple readers tracking an item on a trajectory or catching a shoplifter in the act of destroying a tag or putting the item into a shielded bag and walking away with an item.

SUMMARY OF AT LEAST ONE EMBODIMENT OF THE INVENTION

The present invention uses in one exemplary embodiment a protocol with two symmetric inventoried states, and provides advantages over a ready-quiet protocol. The symmetric version effectively has less state dependence by symmetrizing the quiet-ready states into two symmetrical halves, the State A and State B of the protocol.

The symmetry described herein will substantially increase the performance over ready-quiet protocols in cases where tags have been inventoried and put into the quiet state, and it is desired to inventory them again, either from a different reader station, or as part of a continuous inventory to monitor tags being removed, on a timely basis.

One implementation of the tag is to supply a persistent node that maintains its state for at least twenty seconds even in the absence of power. Assuming that the persistent node decays to the zero (0) state, [0] would encode State A, and [1] will encode State B. State B expires with time into the State A. There is no upper bound on the time that State B persists, and it is not permitted to be in states where it is randomly powering up into State A or State B. The suggested implementation is to write the persistent node with 0 upon reading a 0. An alternative preferred implementation is to have two separate persistent nodes for State A and State B, always clearing one when setting the other. In this case, when both nodes have expired, the tag should respond to all commands of either the A or B type.

The present invention is a method and apparatus for automatically identifying items that are tagged with an RFID tag that has two symmetrical states. The RFID tag may be a unique tag or a non-unique tag. In one exemplary embodiment, both states may be persistent states. In an alternative embodiment, one state may be a persistent state and the other state may be a transient state. Initially, in this one exemplary embodiment, all items are in an unknown state. The system of this exemplary embodiment consists of a reader, which transmits RF signals, and RFID tags which may be powered by the RF energy. The reader uses a series of coded interrogation signals to search a population of tags. The search may be a random search or a binary tree search that systematically classifies and separates groups and sub-groups that match more and more specific search criteria.

In one example of a tree approach, at each search level, tags that match the interrogation signal sort themselves into temporal bins corresponding to a subset of their binary coded ID's. The reader has the ability to detect if there is more than one tag in a temporal bin, indicating that additional sorting is required. Eventually, each bin contains either no members, or one member. The identity of the member of a populated bin can then be read. All items so identified are then placed in the other state where they will not respond to interrogation signals coded to evoke responses from items in the persistent state. Once this process has been run to completion, the roles of the states are reversed, and the inventory is run again. This technique allows the identification of items that might have been missed in the first identification round because they were in the wrong initial state, or missed one or more commands due to weak signals, multipath interference, or distance.

One aspect of the invention involves a command structure that has at least a two-state symmetry. This involves, in one embodiment, a QuietA command and a QuietB command. According to this aspect, an exemplary embodiment of a method for identifying tags includes: issuing from a reader a first set of commands of a first type (e.g., the PingIDA, ScrollIDA, and QuietA commands of the protocol, described below) to identify tags in a first group of tags which are in a first state (e.g. State A), wherein a first command (e.g. QuietA) in the first set of commands of the first type causes addressed tags to be placed in a second group of tags which are in a second state (e.g. State B) which are addressable by a second set of commands of a second type (e.g. PingIDB, ScrollIDB, and QuietB which are described below), wherein the first group of tags (in the first state) do not respond to the second set of commands of the second type (e.g. tags in State A do not respond to PingIDB, ScrollIDB, and QuietB); and wherein the method also includes issuing from a reader the second set of commands of the second type (e.g., the PingIDB, ScrollIDB, and QuietB commands of the protocol, described below) to identify tags in the second group of tags in the second state wherein a second command (e.g. Quiet B) in the second set of commands of the second type causes addressed tags to be placed in the first group of tags (in the first state) which respond to the first set of commands of the first type and wherein the second group of tags (in the second state) do not respond to the first set of commands of the first type.

BRIEF DESCRIPTION OF THE DRAWINGS

The present invention is illustrated by way of example and not limitation in the figures of the accompanying drawings in which like references indicate similar elements.

FIG. 12A illustrates an example of a multi-level binary search

FIG. 12B illustrates an example of tag backscatter in response to a binary search.

FIG. 12C illustrates another example of tag backscatter in response to a binary search.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

Figure 1:
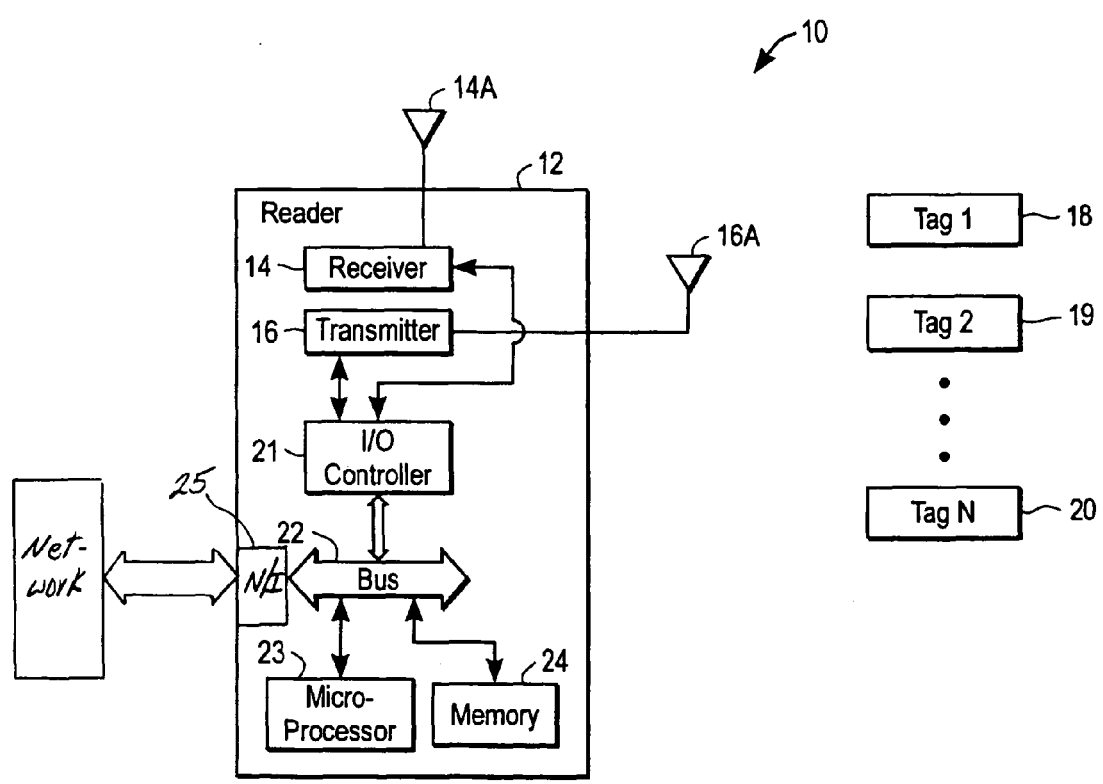
FIG. 1 illustrates one embodiment of an identification system that includes a reader and a plurality of RF tags.

FIG. 1 illustrates an example of an identification system 10, which includes a reader 12 and a plurality of tags 18, 19, and 20. The system is typically a reader-talks-first RF ID system using either passive or semi-passive active backscatter transponders as tags. The incorporation of a battery and/or memory into a tag is an expanded feature to facilitate longer read range; however, the use of the battery does require certain trade-offs, such as higher costs, limited longevity, larger form factor, greater weight, and end-of-life disposal requirements. Thus the tags 18, 19, and 20 may have memory and/or a battery or may have neither of these elements. It will be appreciated that different types of tags may be mixed in a system where a reader is interrogating tags with batteries and tags without batteries.

There are at least 4 classes of tags which may be used with the present invention: (1) no power source on the tag except for power which is obtained from the tag's antenna, but the tag does include a read-only memory which has the tag's identification code; (2) a tag without internal power, but when powered from the reader, can write data to non-volatile memory in the tag; this type of tag also includes memory for storing the identification code; (3) a tag with a small battery to provide power to the circuitry in the tag. Such a tag may also include non-volatile memory as well as memory for storing the tag's identification code; (4) a tag which can communicate with other tags or other devices.

FIG. 1 shows one embodiment of a reader. The reader 12 will typically include a receiver 14 and a transmitter 16, each of which is coupled to an I/O (input/output) controller 21. The receiver 14 may have its own antenna 14A, and the transmitter 16 may have its own antenna 16A. It will be appreciated by those in the art that the transmitter 16 and the receiver 14 may share the same antenna provided that there is a receive/transmit switch which controls the signal present on the antenna and which isolates the receiver and transmitter from each other. The receiver 14 and the transmitter 16 may be similar to conventional receiver and transmitter units found in current readers. The receiver and transmitter may typically operate, in North America, in either the frequency range of about 900 megahertz band or the 2400 megahertz band. It will be appreciated, however, that the operation of the RFID system disclosed herein is not dependent upon the specific operating frequency. The receiver and transmitter are coupled to the I/O controller 21 that controls the receipt of data from the receiver and the transmission of data, such as commands, from the transmitter. The I/O controller is coupled to a bus 22, which is in turn coupled to a microprocessor 23 and a memory 24. There are various different possible implementations that may be used in the reader 12 for the processing system represented by elements 21, 22, 23, and 24.

In one implementation, the microprocessor 23 is a programmable microcontroller, such as an 8051 microcontroller or other well-known microcontrollers or microprocessors (e.g. a powerPC microprocessor), and the memory 24 includes dynamic random access memory and a memory controller which controls the operation of the memory; memory 24 may also include a non-volatile read only memory for storing data and software programs. The memory 24 typically contains a program that controls the operation of the microprocessor 23 and also contains data used during the processing of tags as in the interrogation of tags. In one embodiment further described below, the memory 24 would typically include a computer program which causes the microprocessor 23 to send search commands through the I/O controller 21 to the transmitter and to receive responses from the tags through the receiver 14 and through the I/O controller 21.

The memory 24 would further include a data structure such as a binary tree, e.g. a binary tree shown in the above noted patent applications which were incorporated by reference, which tree is created as a result of the particular search algorithm which is further described below or in these applications. The reader 12 may also include a network interface 25, such as an Ethernet interface, which allows the reader to communicate to other processing systems through a network 26. The network interface would typically be coupled to the bus 22 so that it can receive data, such as the list of tags identified in an interrogation from either the microprocessor 23 or from the memory 24.

Figure 2:
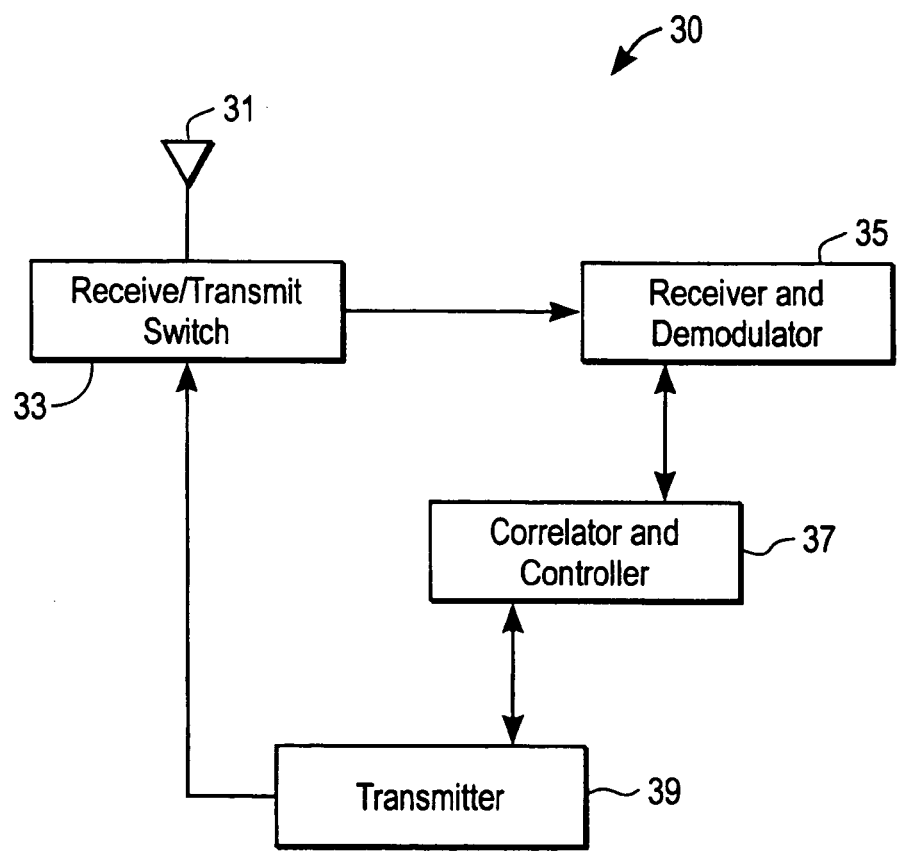
FIG. 2 illustrates one embodiment of an RF tag.

FIG. 2 shows one embodiment of a tag that may be used with the present invention. The tag 30 includes an antenna 31, which is coupled to a receive/transmit switch 33. This switch is coupled to the receiver and demodulator 35 and to the transmitter 39. A correlator and controller unit 37 is coupled to the receiver and demodulator 35 and to the transmitter 39. The particular example of a tag shown in FIG. 2 may be used in various embodiments in which a memory for maintaining data between commands is maintained in the tag and in which a bit by bit (or a larger data chunk) correlation occurs in the tag. The receiver and demodulator 35 receives signals through the antenna 31 and the switch 33 and demodulates the signals and provides these signals to the correlator and controller unit 37. Commands received by the receiver 35 are passed to the controller of the unit 37 in order to control the operation of the tag. Data received by the receiver 35 is also passed to the control unit 37, and this data may be correlated with the tag's identification code in the embodiments described below and in the above noted applications that were incorporated by reference. The transmitter 39, under control of the control unit 37, transmits responses or other data through the switch 33 and the antenna 31 to the reader. It will be appreciated by those in the art that the receiver/demodulator 35 and the transmitter 39 may have separate antennas such that receive/transmit switch 33 may not be required.

Figure 3:
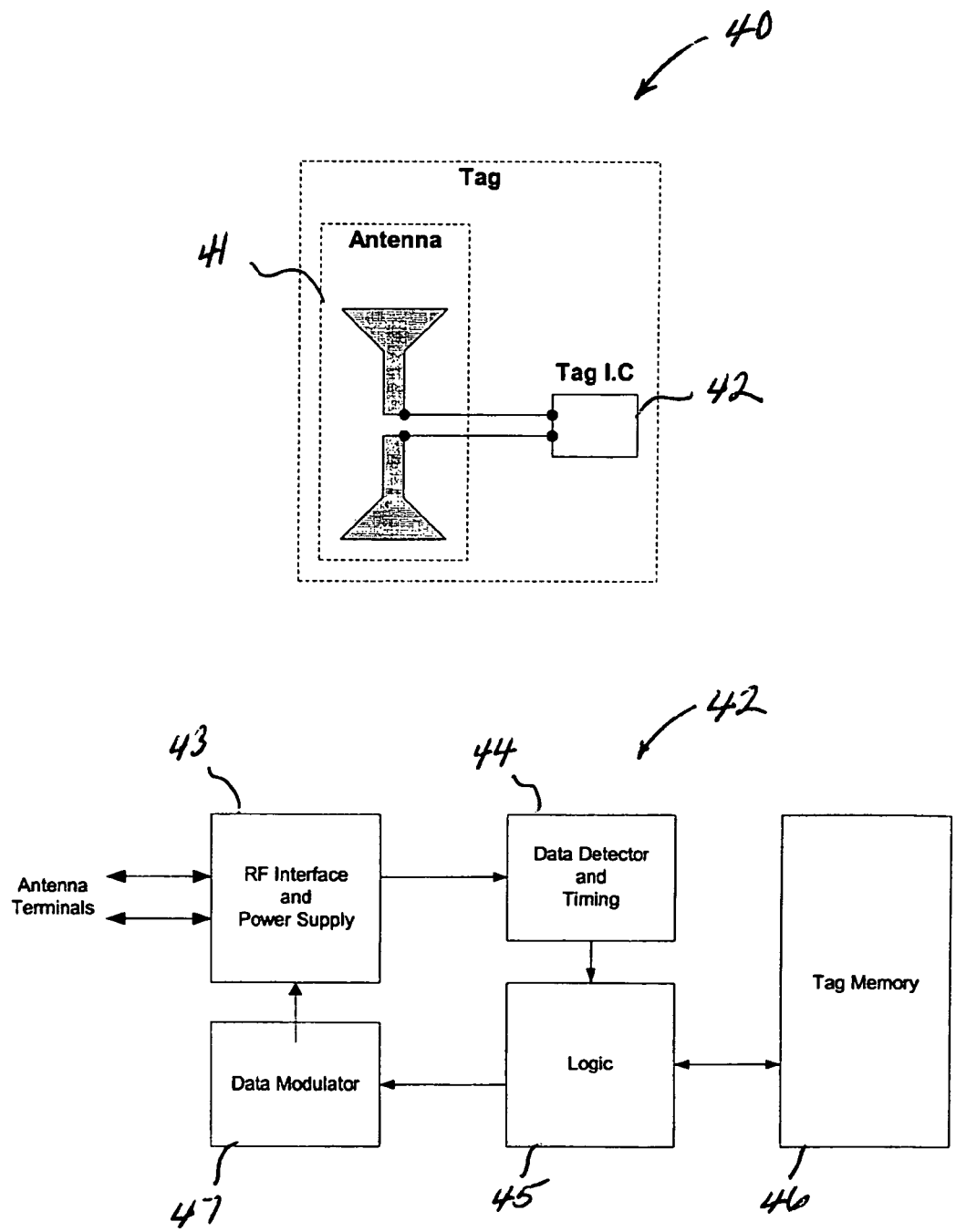
FIG. 3 illustrates another embodiment of an RF tag.

FIG. 3 shows an alternative embodiment of a tag that may be used with the present invention. Tag 40 may consist of an antenna 41, which may be a printed antenna or other low cost antenna, and an integrated circuit (IC) 42, connected together. The IC implements a command protocol and contains the tag's identity code, which may be an electronic product code (EPC™) conforming to a tag data standard such as the TAG Data Standard promulgated by the Tag Data Standard Working Group of EPCGlobal. The antenna receives interrogation signals from reader 12 and reflects the interrogation signal back to the reader in response to a modulation signal created by the IC. The tag IC may comprise an RF interface and power supply 43, a data detector and timing block 44, control logic 45, tag memory 46 and a data modulator 47. In one embodiment, the RF interface and power supply 43 converts RF energy from the reader into DC power required for the IC 42 to operate, and provides modulation information to the data detector and timing block 44. Alternatively, power may be supplied by an integral battery. The data detector and timing block 44 de-modulates the reader signals and generates timing and data signals used by the control logic 45. The RF interface 43 also provides a means of coupling the tag modulation signals to the antenna 41 for transmission to the reader. The control logic 45 provides the command and control functions that coordinate all of the functions of the IC 42. The control logic 42 interprets data from the reader, performs the required internal operations and determines if a tag will respond to the reader. The control logic 42 implements the state diagram and communications protocol described below. The tag memory 46 contains the EPC™ code of the item tagged by the RF tag. The tag memory 46 may contain a unique identification code or a non-unique identification code. The tag memory may also contain a checksum that may be used for error detection. The data modulator translates the binary tag data into a signal that is applied to the RF interface 43 and then transmitted to the reader via the antenna 41.

Figure 4:
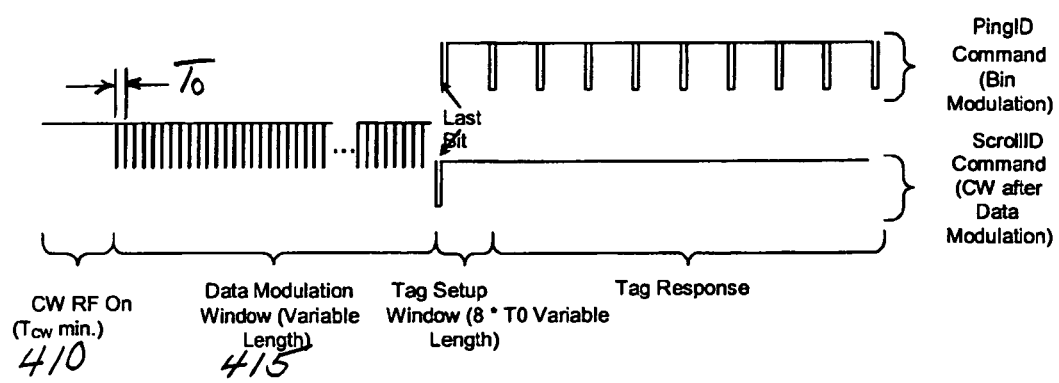
FIG. 4 illustrates one embodiment of a reader-to-tag modulation scheme.
Figure 5:
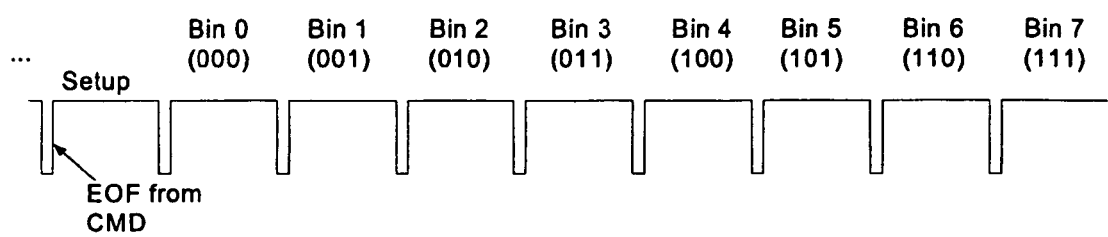
FIG. 5 illustrates a further embodiment of a reader-to-tag modulation scheme.

Readers communicate with a field of tags using one of at least two types of modulation: Data Modulation and Bin Modulation. Data Modulation is used to transmit data from the reader to the tags. Bin Modulation is used during the tag reply interval, following a PingID command, for example, as part of an anti-collision algorithm that sorts tag responses into time slots. FIG. 4 illustrates one embodiment of reader-to-tag modulation. Each command is preceded by a period of unmodulated, or continuous wave (CW) signaling 410 to power up the tags and allow the tags to detect the beginning of the command. During the Data Modulation of a command 415, the reader provides a master clock signal to tags in their neighborhood. The time between clock ticks, $T_0$, determines the reader-to-tag data rate. The tags may be synchronized to the active reader on the negative or positive edges of the RF data modulation envelope. Subsequent signaling may be tied to this fundamental frequency in a proportional manner. In one embodiment of Bin Modulation, as shown in FIG. 5, ten pulses may be sent by the reader to define nine time intervals. The first interval, after the end of the preceding command (EOF), is used by the tags to set up for modulation. The remaining eight intervals, shown as Bin numbers 0 thru 7 in FIG. 5, are used to define response intervals for the tags.

Figure 6:
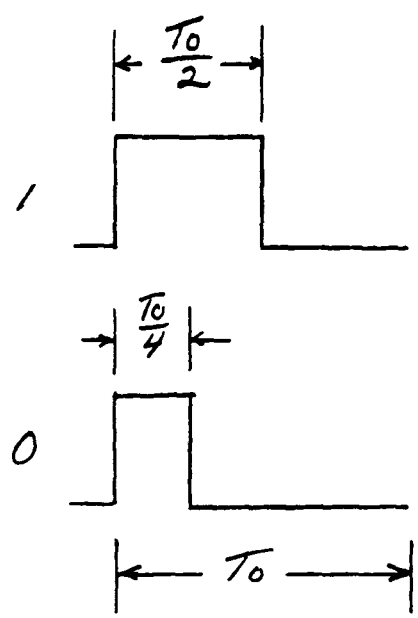
FIG. 6 illustrates one embodiment of reader-to-tag data encoding.

In one embodiment of reader-to-tag data modulation, as illustrated in FIG. 6, binary data from the reader may be encoded as pulse width modulation. In this exemplary embodiment, logical zeros may be defined as a modulation whose width is one fourth (¼) of the master clock interval, $T_0$. Logical ones may be encoded as a modulation whose width is one half (½) of the master clock interval, $T_0$.

Figure 7A:
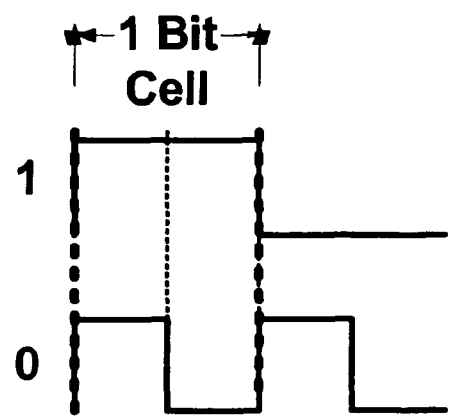
FIG. 7A illustrates one embodiment of tag-to-reader data encoding.
Figure 7B:
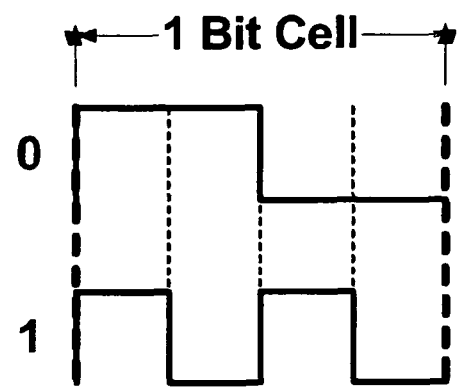
FIG. 7B illustrates another embodiment of tag-to-reader data encoding.

Tags reply to reader commands with backscatter modulation. In one embodiment of tag-to-reader modulation, as shown in FIG. 7A, binary data from a tag is encoded in a two-interval bit cell where a logical 1 is encoded as a high state during both intervals and a logical zero is encoded as a high state during the first interval and a low state during the second interval. In an alternative embodiment, as shown in FIG. 7B, data may be encoded in a four-interval bit cell. While requiring more time to encode data, this later modulation scheme allows a reader to detect tag contentions between tags, when more than one tag responds in a given time interval, as described below.

Figure 8:
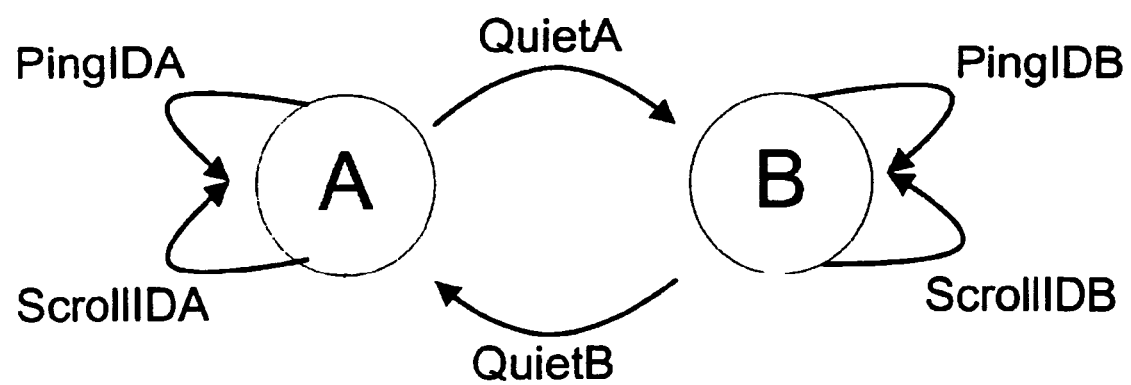
FIG. 8 illustrates a state diagram for one embodiment of a two-state tag protocol.

FIG. 8 shows a state diagram in one embodiment of a two-state command protocol according to the present invention. The tag IC control logic implements the protocol by reacting to commands received from a reader. The state diagram shows all the states that a tag may take in response to command sets issued from a reader. In the exemplary embodiment of FIG. 8, the command set for State A consists of the commands QuietA, PingIDA and ScrollIDA. Similarly, the command set for State B consists of the commands QuietB, PingIDB and ScrollIDB. These commands, which comprise the basic command set for interrogating and identifying tags, are described in detail below. States A and B are intended to be persistent states, even in the absence of power derived from the reader's RF signal, although in certain embodiments they may be temporary states. After a long period of time, at least 20 seconds but possibly hours, State B will revert to State A. Tags in State A respond to PingIDA and ScrollIDA commands but not PingIDB and ScrollIDB commands. Upon receipt of a QuietA command, a tag in State A will enter into State B. Tags in State B respond to PingIDB and ScrollIDB commands but not PingIDA or ScrollIDA commands. Upon receipt of a QuietB command, a tag in State B will enter into State A.

Figure 9:
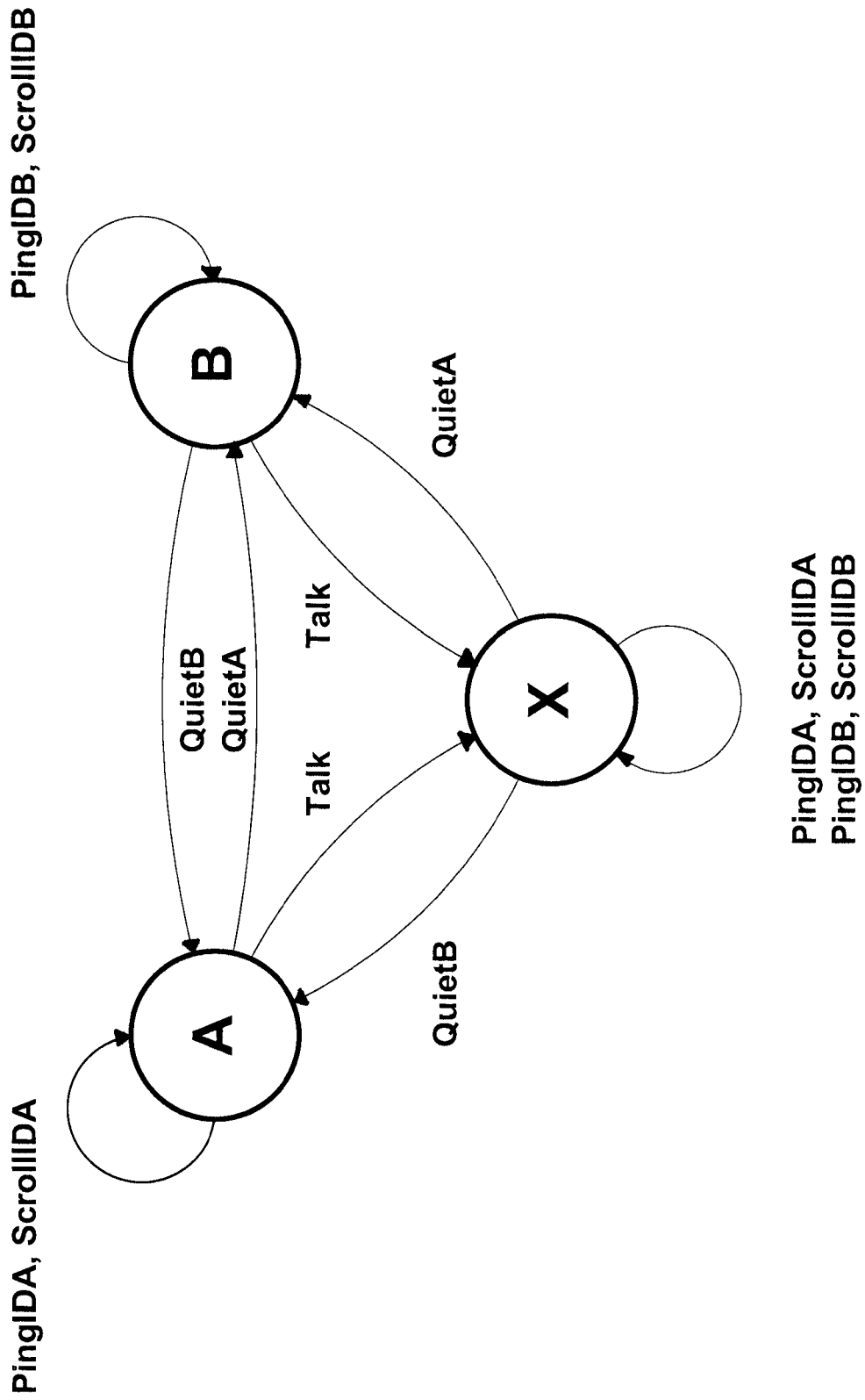
FIG. 9 illustrates a state diagram for one embodiment of a three-state tag protocol.

Alternatively, a command protocol may be embodied as a three-state protocol, as illustrated in FIG. 9, with the addition of a Talk command. When a tag is in State X, the ground state, it will respond to any valid State A or State B interrogation command, including PingIDA, ScrollIDA, PingIDB and ScrollIDB. Upon receipt of a valid QuietB command, a tag in State X will transition to State A. Upon receipt of a valid QuietA command, a tag in State X will transition to State B. When a tag is in State A, it will respond to the State A commands PingIDA and ScrollIDA. Upon receipt of a valid QuietA command, a tag in State A will transition to State B. Upon receipt of a Talk command, a tag in State A will transition to State X. When a tag is in State B, it will respond to the State B commands PingIDB and ScrollIDB. Upon receipt of a valid QuietB, a tag in State B will transition to State A. Upon receipt of a Talk command, a tag in State B will transition to State X. States A and B and C may be persistent states. After a long period of time, states A and B will revert to State X.

PingID, ScrollID and Quiet commands may be used to implement a binary search algorithm to sort, isolate and identify tags. PingId, ScrollID and Quiet commands may contain fields that specify matching criteria for all or some portion of a tag's identification code. In one embodiment, the command may contain a pointer field [PTR] to indicate the bit location in a tag's identification code where the matching operation is to begin. For example, the value of the pointer may specify a location relative to the least significant bit of the tag's identification code. The command may also contain a length parameter [LEN] to indicate the number of bits in the identification code to be matched, as well as a value parameter [VALUE] to specify the exact sequence of bits to be matched. In response, a tag addressed by the reader will attempt to match the value parameter with the ID data in its stored memory, starting at the pointer location, for the specified number of bits.

Tags matching data sent in a ScrollID command may reply by sending back their complete identification code, which may start from the least significant bit. Therefore, ScrollID commands may be used to look for specific tags or test for the presence of specific groups of tags in the field.

Figure 10:
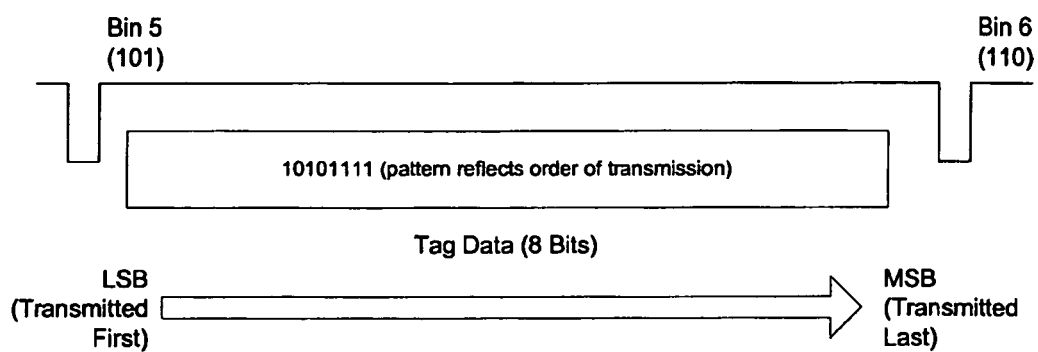
FIG. 10 illustrates an example of a tag response.

Tags matching data sent in a PingID command may reply with eight bits of the tag address, starting at a point immediately above the most significant bit of the matched data, and proceeding from there toward the most significant bit of the tag's address. Each tag response is placed in one of eight time bins delineated by clock ticks sent from the reader after a setup interval as previously described. The three bits of tag memory directly above the matched data may be used to determine the particular response interval for a tag reply. For example, tags having the next three bits above the matched data of '000' respond in the first interval, tags with the next three bits higher of '001' reply in the second interval and so on out to '111' in the eighth interval. These intervals are referred to as bins numbered zero (0) through seven (7). FIG. 10 illustrates an example of a tag responding in Bin 5 (binary 101) because the first three bits of its response (101) correspond to the bin number. It will be appreciated by one skilled in the art that a tag may be configured to respond to a PingID command with greater or fewer than eight bits, and that a greater or fewer number of time bins may be defined by using more or less than 3 bits of the response. The PingID command is used extensively in the anti-collision algorithm described below.

Tags matching data sent in a Quiet command will respond by either changing state or remaining in their present state, depending on which Quiet command is transmitted by the reader. For example, if a Quiet A command is sent, matching tags in State A will transition to State B while matching tags in State B will remain in State B. Conversely, if a Quiet B command is sent, matching tags in State B will transition to State A while matching tags in State A will remain in State A.

The PingID command in either the A or B version divides a population of tags, in one exemplary embodiment, into eight sub-populations based on their addresses by binning tag responses into eight separate time slices. This binning provides the basis of an anti-collision algorithm that probes the binary address tree three bits at a time. Individual tags can be isolated from large populations in the field of the reader by issuing multiple PingID commands to the field, analysing the responses and eventually issuing the appropriate ScrollID command to identify individual tags.

Figure 11:
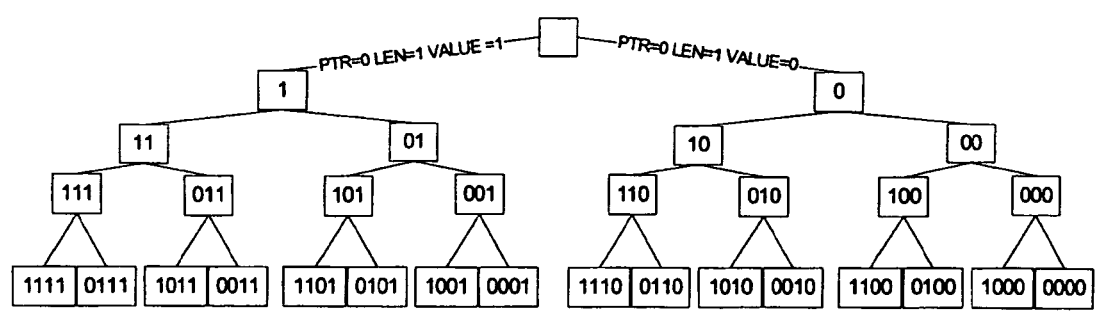
FIG. 11 illustrates one embodiment of a binary search according to the present invention.

FIG. 11 illustrates the use of the PingID command to execute a binary tree search on a population of tags. A PingID command with [PTR]=0, [LEN]=1 and [VALUE]=0 probes the right half of this tree (the zero branch) through the first four bits of tag memory. Similarly, a PingID command with [PTR]=0, [LEN]=1 and [VALUE]=1 probes the left half of this tree (the 1 branch) through the first four bits of Tag memory.

For the PingID command with [PTR]=0, [LEN]=1 and [VALUE]=0, tags with least significant bits (LSBs) of 0000 respond in bin 0, Tags with LSBs of 0010 respond in bin 1 and so on, out to bin 7 where tags with LSBs 1110 respond. Readers can look for backscatter modulation from the Tags in each of these bins and learn about the Tag population even if collisions make reading the eight bits of data sent by the tags difficult. Merely the presence of backscatter in a given bin is an indication that one or more tags match the query. The bin number tells the reader what the next three most significant bits (MSBs) of tag address are.

Figure 13:
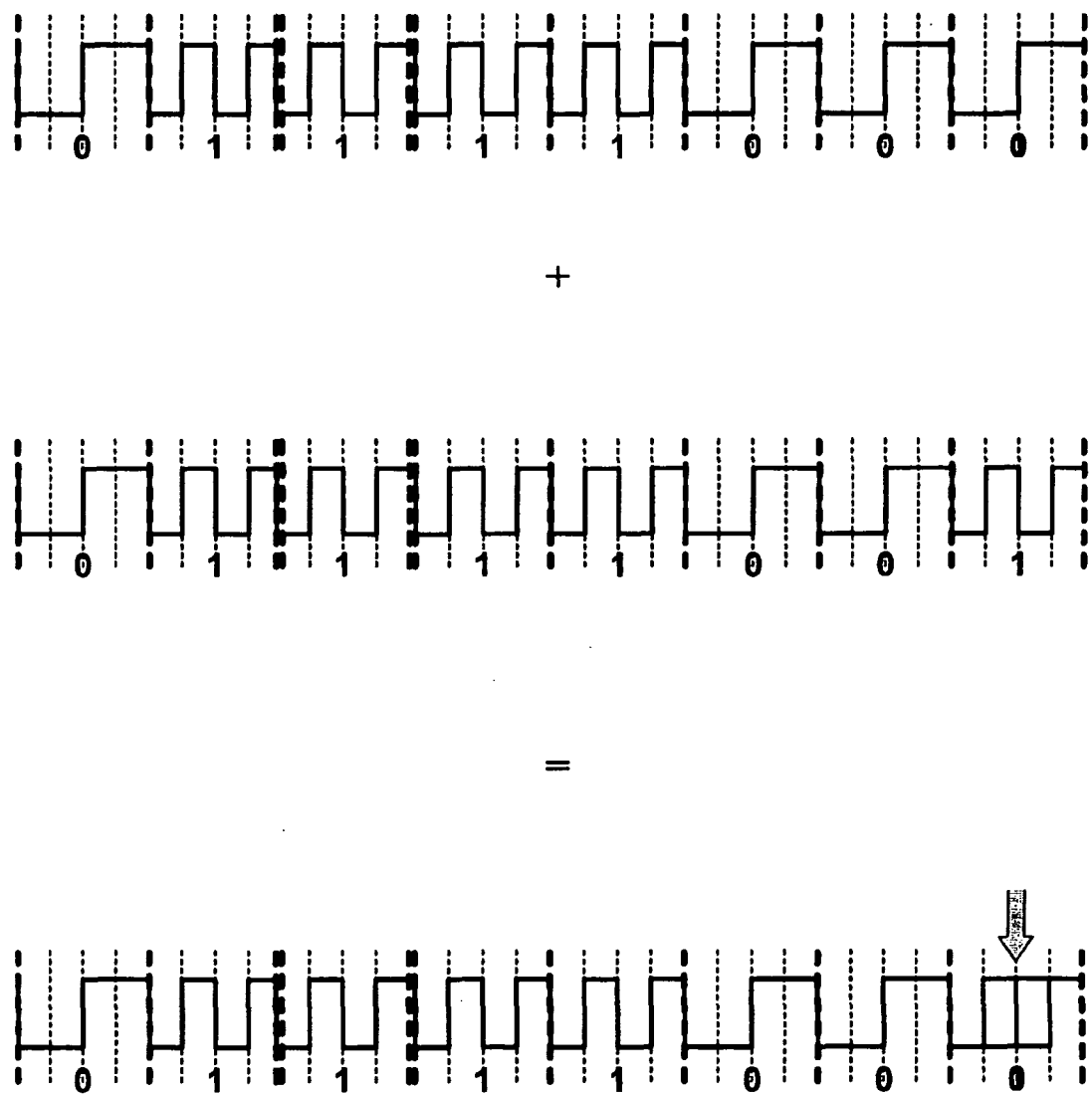
FIG. 13 illustrates one embodiment of collision detection.

As an example, assume a population of tags in State A with multiple tags having addresses with LSBs of 0111 and 1011. A PingIDA command with [PTR]=0, [LEN]=1 and [VALUE]=1 will probe the left half of the tree, shown as Query 1 in FIG. 12A. The [VALUE] field of 1 matches the first bit of all the tags in this example, making them eligible to respond. During the reply interval, these tags will modulate the next eight bits of their address data above the matched portion. The bin in which they modulate is determined by the three LSBs of the data they will modulate. At the reader, backscatter modulation is observed in bins three (3) and five (5), as shown in FIG. 12B. Because multiple tags are modulating in each of these bins, contention is observed, but the reader now knows there are tags present, and that there are two distinct populations with the first four LSBs of 0111 and 1011, respectively. Furthermore, if the tags are programmed to respond with four interval bit cell modulation, as discussed above, the reader may be able to determine in which bits the multiple responses differ and thereby glean additional information about the tag population. FIG. 13 illustrates contention detection in the case of two tags responding in bin 3 (LSBs=011) and differing in their most significant bit. The superposition of the two responses creates an indeterminate response that is neither a logical zero nor a logical one, so the reader knows there are at least two tags present that differ in that bit position.

Using this information, the reader may issue a second PingIDA command to explore the population of tags in bin three, reserving the tags seen in bin five for later analysis. The population in bin three may be explored by issuing a PingIDA command with [PTR]=0, [LEN]=4 and [VALUE]=7 (binary 0111). The effect of this command is to explore three bits farther into the tree towards the MSB from the 0111 position, shown as Query 2 in FIG. 12A. The branches highlighted contain groups of tags that match the second query. These are the same tags that were responding to the first query in bin three. In this new query, tag modulation during the reply interval would show up in bins one (1), six (6) and seven (7) as shown in FIG. 12C. The reader now knows six bits of address information for these tags as well as at least three bits of information for the tag branch not pursued in the first query. The reader may continue in this vein, and use the PingIDA command to follow a branch through the tag ID space until it explores the entire tag address.

A preferred method to perform an analysis of a population of tags is to take advantage of the reader's ability to detect contention in the reply intervals. In the case The exemplary "divide by eight" anti-collision feature of the PingID command allows one to very quickly reduce the number of tags replying in each bin. For example, in a 100-tag population with random addresses, fewer than four PingID commands, on the average, are needed to isolate a tag, and in the process, other tags are singulated as well. If only a single tag replies in a given bin the reader can decode the eight (8) bits of information being sent from the tag and issue a ScrollID command to that Tag using the [PTR], [LEN] and [VALUE] data that successfully singulate the tag.

To utilize the two-state symmetry of the communication protocol, readers may start by performing an inventory as described above, using the PingIDA, ScrollIDA, and QuietA commands. After no further tags are responding, the reader may issue high level PingIDA commands again (e.g., commands at the root of the search tree) to explore any tags which were missed in the initial search. Note that a tag in state A would be counted even if it were only powered for a brief time, just long enough to see a command to synchronize its clock, a PingIDA command, a ScrollIDA command, and a QuietA command. At this point all tags that were inventoried in state A would be in state B. The reader can then begin an inventory of tags in state B using the PingIDB, ScrollIDB, and QuietB commands in a process completely analogous to the state A inventory. This second inventory would count all of the tags that were put into state B as a result of the state A inventory, as well as tags that were in state B initially and not counted in the state A inventory.

Any tag that is continuously in the field is counted in every A/B inventory cycle. Any tag that enters the field will be counted, in the worst case, in the second inventory after it enters the field. For tags at the edge of the detection range, as multipath interference changes, or as the tag or other objects are moved in the reader field, the power available to the tag fluctuates and may only be sufficient to power the tag for brief periods of time. Persistent quiet allows the majority of tags to be counted quickly and for high-level pings to be generated over and over again, seeking out tags that are only intermittently powered. The symmetrical commands extend this counting capability to tags that have just been inventoried and put into the quiet state, or as part of a continuous inventory process. One advantage of this approach is that it prevents the tags from ever entering a state where they are hard to count.

In one embodiment, tags within a population of tags may be assigned to different sessions to enable a reader, or multiple readers, to conduct inventories in orthogonal search spaces. For example, a tag memory may contain both a state bit and a session bit. The state bit may be set to 0 or 1, corresponding to states A and B, respectively, and the session bit may be set to 0 or 1, corresponding to session 1 or session 2, respectively.

One example of the use of two sessions is a portal reader, which is counting all tags coming through a portal, that wants to preferentially count pallets. The reader could run two simultaneous processes on the tag population. Session 1, for example, could be used by one process to sweep the entire population of tags between state A and state B to insure that all tags are counted, regardless of their initial state. Session 2 could selectively mask all pallet tags to state A for that session and all other tags to state B, and then count them preferentially in an interleaved process, without interfering with the ongoing inventory in the first process.

Another example of sessions would be a set of store inventory readers, set to synchronize their inventory types. The readers might use session 1 at the tags to inventory from state A to state B and back to state A. At the same time, a handheld reader might use session 2 to search for a specific product code by masking a sufficient portion of the product identification code to state A while masking all other tags to state B. It may then use session 2, state A commands to seek that specific tag or tag type. It will be appreciated that the number of sessions will only be limited by the number of bits in the tag memory that are devoted to session flags.

In some applications, it may be useful to exclude tags from an inventory that are not of interest, without running multiple sessions. Excluding tags that are not of interest is preferable to selecting tags that are of interest. A tag of interest that is missed by a selection command will be left out of the inventory. On the other hand, a tag that is not of interest, which is missed by an exclusion command, may be inventoried if its ID falls within the parameters of the search. However, once the tag is identified, it can be ignored.

Tags that are not to be counted may be excluded by using AB symmetry. During each phase of an inventory, A to B or B to A, commands may be issued to transfer tags that are not of interest to the other state without inventorying them. For example, if an inventory is being done from the A state to the B state, a command may be issued to place all tags which are not of interest into state B. These commands can be issued as often as desired during the inventory. The remaining tags are inventoried from state A to state B one at a time. If any tags are missed by the commands to exclude them, they are simply counted and the information is ignored. When it is determined that no more tags remain in state A, the same procedure may be run from the B state to the A state. Commands may be issued to place all tags that are not of interest into state A without inventorying them. Again, these commands may be issued as often as desired during this part of the inventory cycle. The remaining tags are inventoried from state B to state A, one at a time. If any tags are missed by the commands to exclude them, they are simply identified during the inventory and the information can be ignored.

This method of excluding unwanted tags from the inventory does not allow a complete Boolean expression to be issued that incorporate tag condition primitives as discussed in U.S. Pat. No. 5,828,318, incorporated herein by reference. However, the selection methods described therein do not avoid the problem that some tags in the population may miss any particular command. It is desirable, therefore, to combine the specification of complete Boolean expressions over the primitive set conditions available at the tags with the ability of AB symmetry to work in the presence of unreliable communication with the tags. The methods of Boolean selection set out in U.S. Pat. No. 5,828,318 may be combined with the AB symmetric inventory process by using a separate three state methodology as described in U.S. Pat. No. 5,828,318 to set up an unselected population of tags. This unselected population may be set up as often as desired, controlling their participation in the inventory process at a specific interval during the inventory, without affecting the population of the AB states.

In one embodiment of a combination of AB symmetry and Boolean selection, a three state method may be implemented. To avoid confusion, and without loss of generality, the three states of the three state machine described in U.S. Pat. No. 5,828,318 may be named state #1, state #2, and state #3. State

1 may be the unselected state, and tags that are in state #1 do not participate in the inventory.

During the initial phase of an inventory, A to B for example, commands may be issued to put tags that are not of interest into state #1. Both of the other two states of the three state machine described in U.S. Pat. No. 5,828,318 would be treated as selected states. These commands may be issued as often as desired during the inventory, to achieve the desired Boolean selection criteria. The remaining tags are inventoried from state A to state B, one at a time. If any tags are missed by the commands to exclude them, they are simply counted and the information is ignored. Once a sufficiently large amount of time has been expended making sure no tags remain in the A state, the same procedure can be run from the B state to the A state. Commands may again be issued, and as often as desired, using the method described in U.S. Pat. No. 5,828,318 to put tags that are not of interest into unselected state #1. The remaining tags are inventoried from state B to state A one at a time. If any tags are missed by the commands to exclude them, they are simply counted and the information is ignored. Thus, all of the tags of interest in the population are counted without having to count most of the tags that are not of interest. No tag is required to receive any particular command to achieve this objective. This allows a Boolean complete expression, using tag condition primitives, to be used to select the tags of interest out of the population.

Figure 14A:
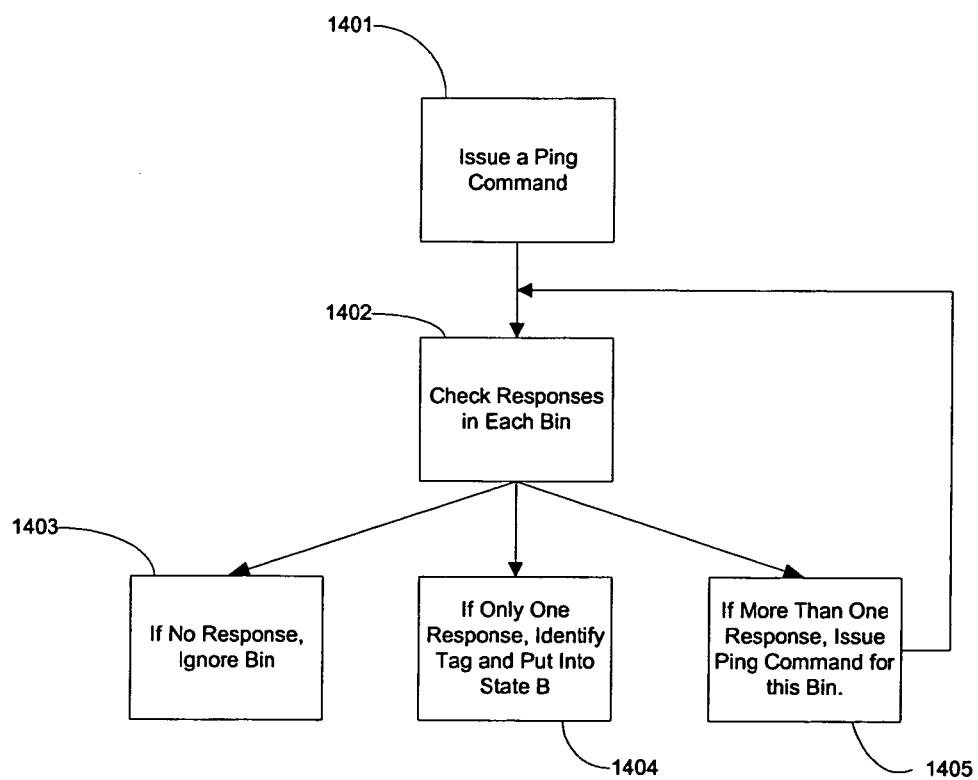
FIG. 14A illustrates one embodiment of a method to identify devices.

FIG. 14 illustrates one embodiment of a method to identify devices using a deterministic search process. FIG. 14A illustrates a basic recursive process that may be used to walk down a binary search tree. At step 1401, an initial Ping command may be issued. This initial Ping command may be a high level command that searches at or near the root of the binary tree, but it may commence the search at any level of the tree. At step 1402, Ping responses may be detected in a plurality of time bins as discussed above. The responses in each bin are evaluated. If a bin has no responses, that bin is ignored, step 1403. If a bin has only one response, that responding tag is identified and put into the other state, step 1404. If a bin has more than one response, that bin is searched by issuing a lower level ping command, step 1405, and the process is repeated until there are no more responses.

Figure 14B:
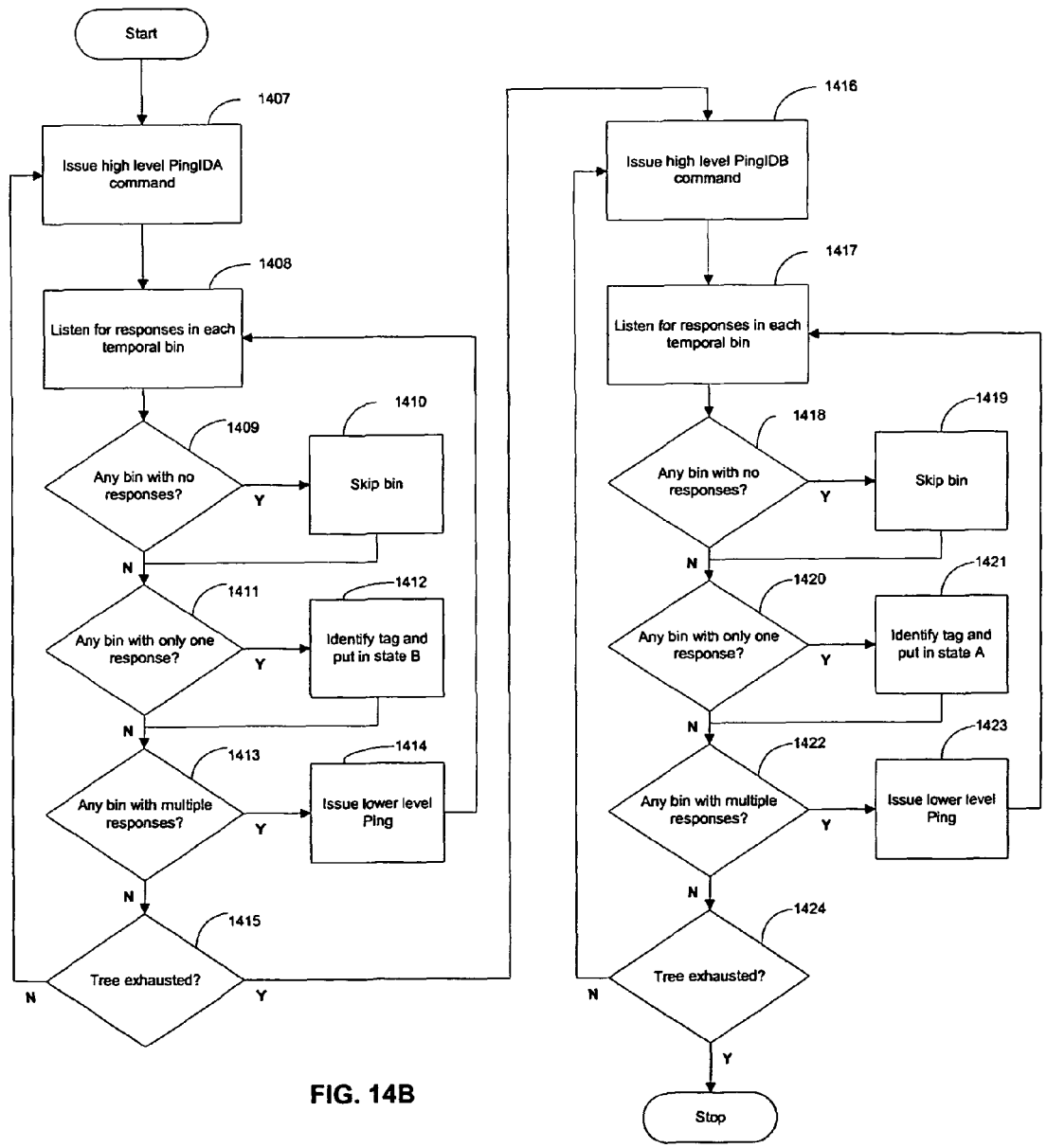
FIG. 14B illustrates another embodiment of a method to identify devices.

FIG. 14B illustrates how the basic recursive search method of FIG. 14A may be implemented using A/B symmetry to deterministically singulate and count tags one at a time. To start, a reader issues a high level PingA command select one half of the search tree (e.g., as illustrated in FIG. 10), step 1407. The reader then listens for tag responses in each time bin, step 1408. Any bin with no responses is ignored, steps 1409 and 1410. If any bin has only one response, the tag responding in that bin is identified and placed in state B, steps 1411 and 1412. If a bin has multiple responses, the reader issues a lower level PingA command to separate the responses in that bin, steps 1413 and 1414. The reader then listens for responses to the lower level PingA command, repeating step 1408. The process repeats until there are no more responses at step 1413. If the entire tree has not been searched at step 1415, the search returns to another high level PingA command, step 1407, and the next branch of the tree is explored. If the entire tree has been searched at step 1415, all of the tags in state A have been inventoried and placed in state B. The search then continues with a high level PingB command, step 1416, to initiate a binary search for all tags in state B. The state B search, steps 1416 through 1424, are completely symmetrical with respect to the state A search, steps 1407 through 1415.

In the foregoing method, every tag in the population is identified when it sends its product identification code to the reader. A product identification code may contain 48, or even 96 or more bits. If the tag also sends a CRC checksum for error checking, the transmission time may be quite long. One approach to reducing the overall time required to conduct an inventory is the use of pseudorandom number pre-acknowledgements. In this approach, a tag that matches the interrogation code will respond with a pseudorandom number, with a high probability of being unique in its response interval, which is much shorter than the full EPC™ code.

It will be apparent from the foregoing description that aspects of the present invention may be embodied, at least in part, in software. That is, the techniques may be carried out in a computer system or other data processing system in response to its processor, such as a microprocessor, executing sequences of instructions contained in a memory, such as reader memory 24 or tag memory 46. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor or controller, such as the microprocessor 23 or the controller 37.

A machine readable medium can be used to store software and data which when executed by a data processing system causes the system to perform various methods of the present invention. This executable software and data may be stored in various places including for example memory 24 or 46. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the claims. The specification and drawings are, accordingly, to be regarded in an illustrative sense rather than a restrictive sense. Further detailed descriptions of certain exemplary embodiments of the present invention that may use aspects of a command structure that has at least a two-state symmetry or aspects of a three-state symmetry, as described herein, can be found in the following sections and in Appendix A.

What is claimed is:
1. A method of identifying tags, the method comprising:
issuing a first set of commands of a first type in a first inventory process to identify tags in a first group of tags which are in a first state and to place the identified tags in a second group of tags, which are in a second state, which are addressable by a second set of commands of a second type, wherein the first group of tags do not respond to the second set of commands of the second type;

issuing the second set of commands of the second type in a second inventory process to identify tags in the second group of tags in the second state and to place the identified tags in the first group of tags which respond to the first set of commands of the first type and wherein the second group of tags do not respond to the first set of commands of the first type, and wherein the second inventory process is similar to the first inventory process;

issuing a third command in the first set of commands of the first type to address tags in the first group of tags in the first state, wherein the third command in the first set of commands of the first type causes addressed tags to be placed in the third group of tags in a third state; and issuing a fourth command in the second set of commands of the second type to address tags in the second group of tags in the second state, wherein the fourth command in the second set of commands of the second type causes addressed tags to be placed in the third group of tags in the third state.

2. A method as in claim 1 wherein the third group of tags in the third state are responsive to either the first set of commands of the first type or the second set of commands of the second type, the method further comprising:

issuing the first set of commands of the first type to identify tags in the third group of tags which are in the third state, wherein the first command in the first set of commands of the first type causes addressed tags to be placed in the second group of tags in the second state; and issuing the second set of commands of the second type to identify tags in the third group of tags which are in the third state, wherein the second command in the second set of commands of the second type causes addressed tags to be placed in the first group of tags in the first state.

3. A method as in claim 1 wherein the third command in the first set of commands causes only a single addressed tag in the first group of tags to be placed in the third group of tags and the fourth command in the second set of commands causes only a single addressed tag in the second group of tags to be placed in the third group of tags.

4. A method as in claim 1 wherein the first command in the first set of commands causes only a single addressed tag in the first group of tags to be placed in the second group of tags and the second command in the second set of commands causes only a single addressed tag in the second group of tags to be placed in the first group of tags.

5. A method performed in a tag, the method comprising:

receiving at a tag in a first state a first set of commands of a first type issued in a first inventory process to identify the tag in a first group of tags in the first state and to place the identified tag in the first state in a second state in a second group of tags in the second state, which are addressable by a second set of commands of a second type, wherein the second group of tags in the second state do not respond to the first set of commands of the first type;

receiving at a tag in the second state the second set of commands of the second type issued in a second inventory process to identify the tag in the second group of tags in the second state and to place the identified tag in the second state in the first state in the first group of tags in the first state, which are addressable by the first set of commands of the first type, wherein the first group of tags in the first state do not respond to the second set of commands of the second type, and wherein the second inventory process is similar to the first inventory process;

receiving at the tag in the first state a third command in the first set of commands of the first type, wherein the third command in the first set of commands of the first type causes the tag to be placed in a third state in the third group of tags; and receiving at the tag in the second state a fourth command in the second set of commands of the second type, wherein the fourth command in the second set of commands of the second type causes the tag to be placed in the third state in the third group of tags.

6. The method of claim 5 further comprising:

receiving at a tag in the third state the first set of commands of the first type to identify the tag in the third group of tags in the third state, wherein the first command in the first set of commands of the first type causes the tag in the third state to be placed in the second state in the second group of tags; and receiving at the tag in the third state the second set of commands of the second type to identify the tag in the third group of tags which are in the third state, wherein the second command in the second set of commands of the second type causes the tag to be placed in the first state in the first group of tags.

7. A non-transitory machine readable medium containing executable computer programming instructions, which when executed by a data processing system, cause the data processing system to perform a method for identifying tags, the method comprising:

issuing a first set of commands of a first type in a first inventory process to identify tags in a first group of tags which are in a first state and to place the identified tags in a second group of tags, which are in a second state, which are addressable by a second set of commands of a second type, wherein the first group of tags do not respond to the second set of commands of the second type;

issuing the second set of commands of the second type in a second inventory process to identify tags in the second group of tags in the second state and to place the identified tags in the first group of tags which respond to the first set of commands of the first type and wherein the second group of tags do not respond to the first set of commands of the first type, and wherein the second inventory process is similar to the first inventory process;

issuing a third command in the first set of commands of the first type to address tags in the first group of tags in the first state, wherein the third command in the first set of commands of the first type causes addressed tags to be placed in the third group of tags in a third state; and issuing a fourth command in the second set of commands of the second type to address tags in the second group of tags in the second state, wherein the fourth command in the second set of commands of the second type causes addressed tags to be placed in the third group of tags in the third state.

8. The non-transitory machine readable medium of claim 7, further comprising executable computer programming instructions, which when executed by the data processing system cause the system to perform operations comprising issuing the first set of commands of the first type to identify tags in the third group of tags which are in the third state, wherein the first command in the first set of commands of the first type causes addressed tags to be placed in the second group of tags in the second state; and issuing the second set of commands of the second type to identify tags in the third group of tags which are in the third state, wherein the second command in the second set of commands of the second type causes addressed tags to be placed in the first group of tags in the first state, wherein the third group of tags in the third state are responsive to either the first set of commands of the first type or the second set of commands of the second type.

9. The non-transitory machine readable medium of claim 7, wherein the third command in the first set of commands causes only a single addressed tag in the first group of tags to be placed in the third group of tags and the fourth command in the second set of commands causes only a single addressed tag in the second group of tags to be placed in the third group of tags.

10. The non-transitory machine readable medium of claim 7, wherein the first command in the first set of commands causes only a single addressed tag in the first group of tags to be placed in the second group of tags and the second command in the second set of commands causes only a single addressed tag in the second group of tags to be placed in the first group of tags.

11. A non-transitory machine readable medium containing executable computer programming instructions, which when executed by a data processing system, cause the data processing system to perform a method performed in a tag, the method comprising:

receiving at a tag in a first state a first set of commands of a first type issued in a first inventory process to identify the tag in a first group of tags in the first state and to place the identified tag in the first state in a second state in a second group of tags in the second state, which are addressable by a second set of commands of a second type, wherein the second group of tags in the second state do not respond to the first set of commands of the first type;

receiving at a tag in the second state the second set of commands of the second type issued in a second inventory process to identify the tag in the second group of tags in the second state and to place the identified tag in the second state in the first state in the first group of tags in the first state, which are addressable by the first set of commands of the first type, wherein the first group of tags in the first state do not respond to the second set of commands of the second type, and wherein the second inventory process is similar to the first inventory process;

receiving at the tag in the first state a third command in the first set of commands of the first type, wherein the third command in the first set of commands of the first type causes the tag to be placed in a third state in the third group of tags; and receiving at the tag in the second state a fourth command in the second set of commands of the second type, wherein the fourth command in the second set of commands of the second type causes the tag to be placed in the third state in the third group of tags.

12. The non-transitory machine readable medium of claim 11, further comprising executable computer programming instructions, which when executed by the data processing system cause the system to perform operations comprising receiving at a tag in the third state the first set of commands of the first type to identify the tag in a third group of tags in the third state, wherein the first command in the first set of commands of the first type causes the tag in the third state to be placed in the second state in the second group of tags; and receiving at the tag in the third state the second set of commands of the second type to identify the tag in the third group of tags which are in the third state, wherein the second command in the second set of commands of the second type causes the tag to be placed in the first state in the first group of tags.

13. An apparatus to identify tags, comprising:

a memory, and a processor coupled to the memory, the processor configured to issue a first set of commands of a first type in a first inventory process to identify tags in a first group of tags which are in a first state and to place the identified tags in a second group of tags, which are in a second state, which are addressable by a second set of commands of a second type, wherein the first group of tags do not respond to the second set of commands of the second type;

the processor configured to issue the second set of commands of the second type in a second inventory process to identify tags in the second group of tags in the second state and to place the identified tags in the first group of tags which respond to the first set of commands of the first type and wherein the second group of tags do not respond to the first set of commands of the first type, and wherein the second inventory process is similar to the first inventory process;

the processor configured to issue a third command in the first set of commands of the first type to address tags in the first group of tags in the first state, wherein the third command in the first set of commands of the first type causes addressed tags to be placed in a third group of tags in the third state; and the processor configured to issue a fourth command in the second set of commands of the second type to address tags in the second group of tags in the second state, wherein the fourth command in the second set of commands of the second type causes addressed tags to be placed in the third group of tags in the third state.

14. The apparatus of claim 13, wherein the processor is further configured to issue the first set of commands of the first type to identify tags in the third group of tags which are in the third state, wherein the first command in the first set of commands of the first type causes addressed tags to be placed in the second group of tags in the second state; and wherein the processor is further configured to issue the second set of commands of the second type to identify tags in the third group of tags which are in the third state, wherein the second command in the second set of commands of the second type causes addressed tags to be placed in the first group of tags in the first state, wherein the third group of tags in the third state are responsive to either the first set of commands of the first type or the second set of commands of the second type.

15. The apparatus of claim 13, wherein the third command in the first set of commands causes only a single addressed tag in the first group of tags to be placed in the third group of tags and the fourth command in the second set of commands causes only a single addressed tag in the second group of tags to be placed in the third group of tags.

16. The apparatus of claim 13 wherein the first command in the first set of commands causes only a single addressed tag in the first group of tags to be placed in the second group of tags and the second command in the second set of commands causes only a single addressed tag in the second group of tags to be placed in the first group of tags.

17. A tag comprising:
a memory, and a processor coupled to the memory, the processor configured to receive at the tag in a first state a first set of commands of a first type issued in a first inventory process to identify the tag in a first group of tags in the first state and to place the identified tag in the first state in a second state in a second group of tags in the second state, which are addressable by a second set of commands of a second type, wherein the second group of tags in the second state do not respond to the first set of commands of the first type, the processor configured to receive at the tag in the second state the second set of commands of the second type issued in a second inventory process to identify the tag in the second group of tags in the second state and to place the identified tag in the second state in the first state in the first group of tags in the first state, which are addressable by the first set of commands of the first type, wherein the first group of tags in the first state do not respond to the second set of commands of the second type, and wherein the second inventory process is similar to the first inventory process, the processor configured to receive at the tag in the first state a third command in the first set of commands of the first type, wherein the third command in the first set of commands of the first type causes the tag to be placed in a third state in the third group of tags, and the processor configured to receive at the tag in the second state a fourth command in the second set of commands of the second type, wherein the fourth command in the second set of commands of the second type causes the tag to be placed in the third state in the third group of tags.

18. The tag of claim 17, wherein the processor is further configured to receive at the tag in a third state the first set of commands of the first type to identify the tag in a third group of tags in the third state, wherein the first command in the first set of commands of the first type causes the tag in the third state to be placed in the second state in the second group of tags, and wherein the processor is further configured to receive at the tag in the third state the second set of commands of the second type to identify the tag in the third group of tags which are in the third state, wherein the second command in the second set of commands of the second type causes the tag to be placed in the first state in the first group of tags.

19. An apparatus to identify tags, comprising:
means for issuing a first set of commands of a first type in a first inventory process to identify tags in a first group of tags which are in a first state and to place the identified tags in a second group of tags, which are in a second state, which are addressable by a second set of commands of a second type, wherein the first group of tags do not respond to the second set of commands of the second type;
means for issuing the second set of commands of the second type in a second inventory process to identify tags in the second group of tags in the second state and to place the identified tags in the first group of tags which respond to the first set of commands of the first type and wherein the second group of tags do not respond to the first set of commands of the first type, and wherein the second inventory process is similar to the first inventory process;
means for issuing a third command in the first set of commands of the first type to address tags in the first group of tags in the first state, wherein the third command in the first set of commands of the first type causes addressed tags to be placed in the third group of tags in the third state; and
means for issuing a fourth command in the second set of commands of the second type to address tags in the second group of tags in the second state, wherein the fourth command in the second set of commands of the second type causes addressed tags to be placed in the third group of tags in the third state.

20. The apparatus of claim 19, further comprising
means for issuing the first set of commands of the first type to identify tags in a third group of tags which are in a third state, wherein the first command in the first set of commands of the first type causes addressed tags to be placed in the second group of tags in the second state; and
means for issuing the second set of commands of the second type to identify tags in the third group of tags which are in the third state, wherein the second command in the second set of commands of the second type causes addressed tags to be placed in the first group of tags in the first state, wherein the third group of tags in the third state are responsive to either the first set of commands of the first type or the second set of commands of the second type.

21. The apparatus of claim 19 wherein the third command in the first set of commands causes only a single addressed tag in the first group of tags to be placed in the third group of tags and the fourth command in the second set of commands causes only a single addressed tag in the second group of tags to be placed in the third group of tags.

22. The apparatus of claim 19 wherein the first command in the first set of commands causes only a single addressed tag in the first group of tags to be placed in the second group of tags and the second command in the second set of commands causes only a single addressed tag in the second group of tags to be placed in the first group of tags.

23. A tag comprising:
means for receiving at the tag in a first state a first set of commands of a first type issued in a first inventory process to identify the tag in a first group of tags in the first state and to place the identified tag in the first state in a second state in a second group of tags in the second state, which are addressable by a second set of commands of a second type, wherein the second group of tags in the second state do not respond to the first set of commands of the first type;
means for receiving at the tag in the second state the second set of commands of the second type issued in a second inventory process to identify the tag in the second group of tags in the second state and to place the identified tag in the second state in the first state in the first group of tags in the first state, which are addressable by the first set of commands of the first type, wherein the first group of tags in the first state do not respond to the second set of commands of the second type, and wherein the second inventory process is similar to the first inventory process;
means for receiving at the tag in the first state a third command in the first set of commands of the first type, wherein the third command in the first set of commands of the first type causes the tag to be placed in the third state in the third group of tags; and
means for receiving at the tag in the second state a fourth command in the second set of commands of the second type, wherein the fourth command in the second set of commands of the second type causes the tag to be placed in the third state in the third group of tags.

24. The tag of claim 23, further comprising
- means for receiving at the tag in a third state the first set of commands of the first type to identify the tag in a third group of tags in the third state, wherein the first command in the first set of commands of the first type causes the tag in the third state to be placed in the second state in the second group of tags; and
- means for receiving at the tag in the third state the second set of commands of the second type to identify the tag in the third group of tags which are in the third state, wherein the second command in the second set of commands of the second type causes the tag to be placed in the first state in the first group of tags.

* * * * *